J. W. SHEAN.
NUT LOCK.
APPLICATION FILED SEPT. 19, 1917.
1,312,810.
Patented Aug. 12, 1919.
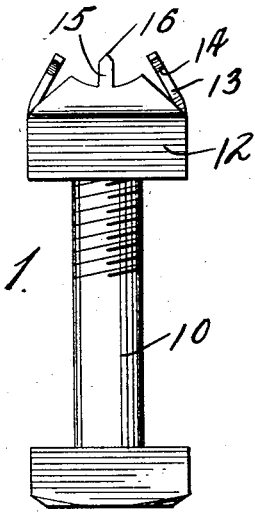
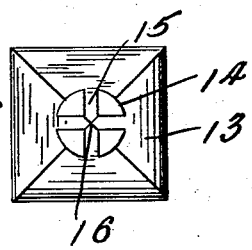
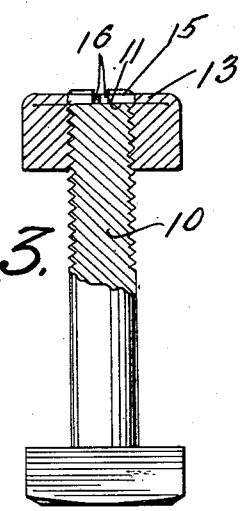
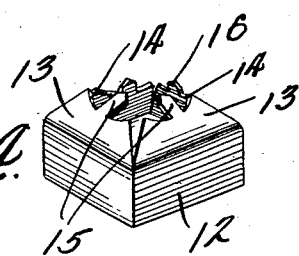
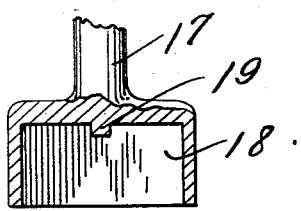
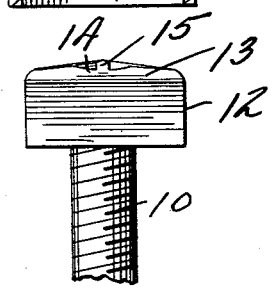
Inventor
J. W. Shean,
By
Attorney

UNITED STATES PATENT OFFICE.

JEREMIAH W. SHEAN, OF YONKERS, NEW YORK.

NUT-LOCK.

1,312,810.     Specification of Letters Patent.     Patented Aug. 12, 1919.

Application filed September 19, 1917. Serial No. 192,124.

*To all whom it may concern:*

Be it known that I, JEREMIAH W. SHEAN, a citizen of the United States, residing at Yonkers, in the county of Westchester, State of New York, have invented certain new and useful Improvements in Nut-Locks; and I do hereby declare the following to be a full, clear, and exact description of the invention, such as will enable others skilled in the art to which it appertains to make and use the same.

This invention is an improvement in nut locks and has for one of its objects the provision of a simple and inexpensive nut having flanges cut to provide locking fingers engageable with the bolt to effectively prevent rotation of the nut thereon, the structure being such that when the fingers are engaged with slots in the bolt end, the outer end of the nut presents a substantially continuous surface that prevents disengagement of the fingers from the bolt.

The inventive idea involved is capable of receiving a variety of mechanical expressions, one of which, for the purpose of illustrating the invention, is shown in the accompanying drawing, wherein:—

Figure 1 is a side elevation of the nut lock constructed in accordance with the invention.

Fig. 2 is an end elevation thereof.

Fig. 3 is a longitudinal section.

Fig. 4 is a detail perspective view of the nut before the same is mounted upon a bolt.

Fig. 5 is a fragmentary side elevation, partly broken away and shown in section, of the device for applying a nut to the bolt and adjusting the fingers to locking position.

Referring to Figs. 1 to 4 of the drawing, the numeral 10 indicates a bolt having the usual screw threads and provided in one end with transverse intersecting slots or grooves 11 the purpose of which will presently appear.

The nut 12 is preferably rectangular and provided on its edges with the tapering flanges 13 which normally extend from the face of the nut in converging relation and each flange, at its outer end, is cut as indicated at 14 to provide a locking finger 15 having its free extremity pointed as indicated at 16. The cutaway portion 14 is curved so that when the flanges are bent down upon the face of the nut said cutaway portions will engage around the bolt 10 and the fingers 15 will project into the adjacent groove 11 with their pointed ends in contacting relation and when in this position the nut will be effectively locked to the bolt and prevented from rotating thereon.

A device may be employed in connection with the nut 12 for mounting the same upon a bolt and said device preferably comprises a key or wrench 17 having a socket 18 shaped to conform to the nut and adapted to receive the same therein after the nut has been adjusted to its proper position on the bolt so that the fingers 15 will be at the entrance to the grooves 11. Now in order to force the fingers to the bottom of said grooves so as to prevent accidental displacement therefrom the key 17 is again employed and for this purpose there is provided centrally in the bottom of the socket 18 a stud or nib 19 which engages the ends of the fingers 15 when the key is mounted over the nut and by exerting a pressure upon said key it will be apparent that said fingers will be forced to the bottom of said grooves.

It will be noted upon reference to Figs. 2 and 3 of the drawings, that when the locking fingers are finally pressed into engagement with the end of the bolt, the wings or flanges 13 are in mutual contact so as to present a continuous outer surface for the nut while the ends of these wings or flanges contact with the bolt. Thus when once pressed into locking positions, the fingers are not susceptible to accidental displacement and in fact the nut is on with substantial permanency.

What is claimed is:—

The combination with a bolt having diametrical slots in its threaded end, of a nut engaged with the bolt and having identical wings rising from all of its sides, all of the wings being correspondingly tapered each in the direction of its free end, the free end of each wing being curvingly reëntrant excepting at its middle portion where it is provided with a parallel sided tongue having a pointed extremity, the wings being bendable to lie flat upon the outer face of the nut, the sides of each wing being at such an angle to each other and the dimensions of the tongues being such that when the wings are upon the outer face of the nut, the side edges of adjacent wings will contact, the reëntrant portions of the ends of the wings will engage the bolt and the tongues will fill the slots of the bolt transversely, whereby entrance of a disengaging tool between the wings and between the tongues and between the bolt and the wings of the tongues, will be prevented.

In testimony whereof I affix my signature in the presence of two witnesses.

JEREMIAH W. SHEAN.

Witnesses:
   JOHN F. KRAUSHAAR,
   FRANCIS J. B. CAFY.